June 21, 1949.  L. R. BROCK  2,473,505
ATTACHABLE LIFTING ARM FOR BULLDOZER BLADES
Filed July 10, 1945  2 Sheets-Sheet 1

INVENTOR.
LOUIS R. BROCK
BY
ATTORNEYS

June 21, 1949.　　　　　L. R. BROCK　　　　　2,473,505
ATTACHABLE LIFTING ARM FOR BULLDOZER BLADES
Filed July 10, 1945　　　　　　　　　　　　　2 Sheets-Sheet 2
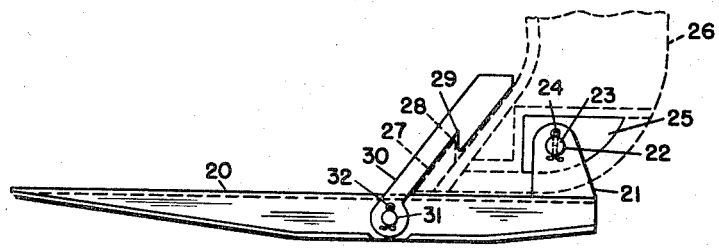
*Fig. 4*
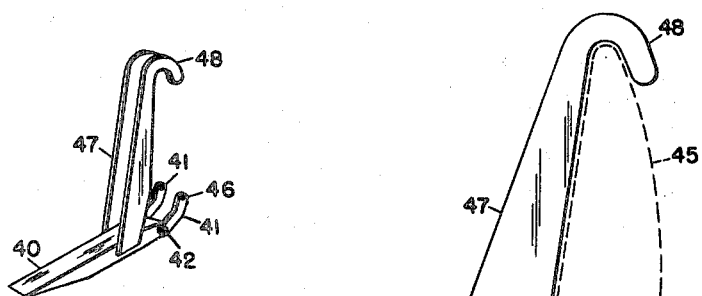
*Fig. 6*
*Fig. 5*
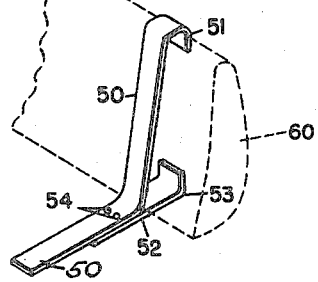
*Fig. 7*
INVENTOR.
LOUIS R. BROCK
BY
J. H. Church & H. E. Thibodeau
ATTORNEYS Patented June 21, 1949

2,473,505

UNITED STATES PATENT OFFICE 2,473,505

ATTACHABLE LIFTING ARM FOR BULLDOZER BLADES

Louis R. Brock, Hague, N. Y.

Application July 10, 1945, Serial No. 604,284

6 Claims. (Cl. 214—131)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to lifting devices, and more particularly to attachable and detachable lifting arms for attachment to a bull dozer blade.

All devices of this character, made according to the teachings of the prior art, and with which I am familiar, have been built solely as load lifting devices. No means has been heretofore provided for changing a bull dozer blade into a device for lifting heavy matériel from the ground.

It is, accordingly, an object of my invention to provide attachable and detachable lifting arms for a bull dozer blade, which are simple in construction, efficient in operation, economical in cost, and with the ability to carry heavy loads.

Other objects of my invention will become evident from the following detailed description, taken in conjunction with the accompanying drawings, in which:

Figure 4 is a side elevational view of another form of my novel lifting tines for attachment to the cutting edge and the bottom side of a bull dozer blade;

Figure 5 is a side elevational view of another form of my novel lifting tines for attachment to a bull dozer blade;

Figure 6 is a perspective view of the lifting tine shown in Figure 5; and

Figure 7 is a perspective view of another form of my novel lifting member.

Figure 3:
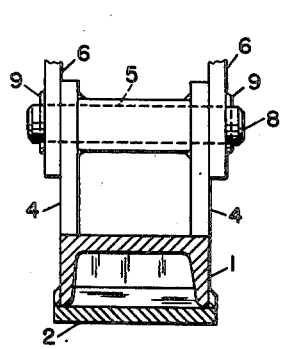
Figure 3 is an enlarged view taken on the line 3—3 of Figure 1.
Figure 1:
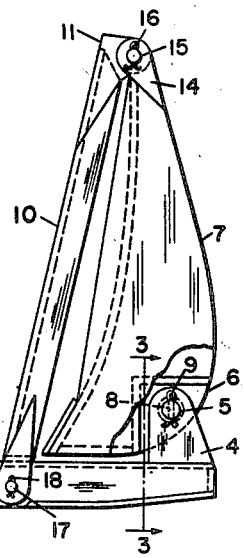
Figure 1 is a side elevational view of my novel lifting member with attached brackets.
Figure 2:
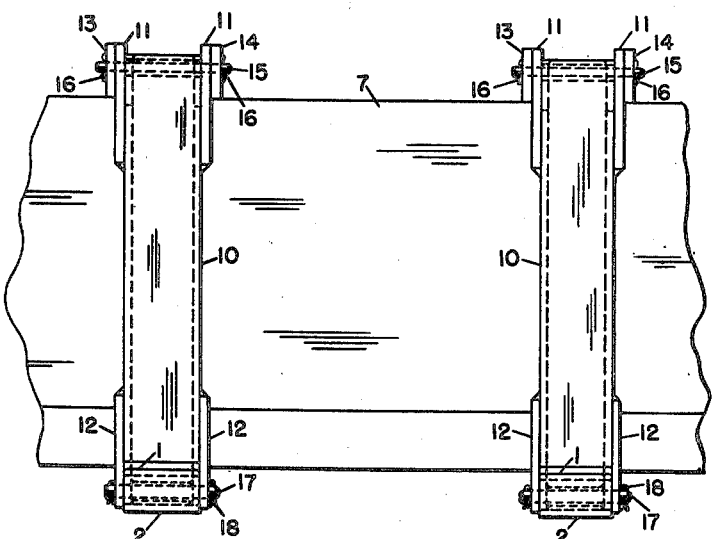
Figure 2 is an end elevational view from the front side of my novel lifting member.

Referring to the drawings, Figures 1, 2 and 3 show a built up lifting arm or tine 1 having an upwardly sloping bottom portion 2 at the front bottom portion thereof forming a point 3 at the front end thereof. An upwardly extending bracket 4 having an aperture 5 is attached to the rear top side of the tine 1 for attachment to a corresponding bracket 6 on the rear bottom side of a bull dozer blade 7 by pin 8, secured by cotter pins 9. An upwardly extending arm 10 having outwardly extending lugs 11 and 12 on the ends thereof is connected to ears 13 and 14 on the top side of the bull dozer blade 7 by pin 15, secured by cotter pins 16, and to the tine 1 by means of a pin 17 secured by cotter pins 18.

In attaching or detaching this form of tine structure, the rear end of the tine 1 can be pivoted on pin 8, or pins 15 or 17.

Figure 4 shows a tine 20 similar to the tine 1 in Figure 1 with an upwardy extending bracket 21 with an aperture 22, extending from the rear upper surface thereof. Pin 23, secured by cotter pin 24, attaches the bracket 21 and tine 20 to a bracket 25 on the rear bottom side of the bull dozer blade 26. The cutting edge 27 of the bull dozer blade 26 has a V-shaped female hook portion 28 for receiving the V-shaped male hook portion 29 on arm 30 having an aperture for attachment to the tine 20 by a pin 31, secured by cotter pins 32. The only difference between this construction and that shown in Figure 1 is the difference between the arms 10 and 30.

Figures 5 and 6 show another form of lifting tine wherein a lifting tine 40 of a shape similar to those previously described has a link 41 pivotally connected to tine 40 at 42 and to a bracket 44 on bull dozer blade 45 at 46. An upwardly extending supporting arm 47 is attached to the side of the tine 40 by welding or otherwise and has a hook portion 48 on the upper end thereof for fitting over the top side of the bull dozer blade 45. The lifting arm 47 is fixed but pivotal movement of the tine 40 is obtained through hook portion 48, when link 41 is detached at 42 or 46.

Figure 7 shows another form of lifting tine 50 wherein flat bar stock is bent as shown with a hook portion 51 for fitting over the top of the bull dozer blade 60. A strap 52 has a hooked portion 53 and is detachably fastened to tine 50 at 54 by bolting or any other suitable method. The strap 52 retains the tine 50 in position by bearing against the bottom and rear surfaces of the bull dozer blade 60.

It will be seen from the foregoing that I have provided novel lifting tines and means connected therewith for attaching them to a bull dozer blade wherein a bull dozer blade may be utilized for lifting heavy articles in the field where no lifting equipment is accessible. This is of particular importance at the present time in that bull dozers are used in the field, and they may be easily and quickly equipped with lifting forks as disclosed in this application to provide lifting means for heavy articles. The tines are particularly important in that they can be forced into the earth under a heavy load in the field and lift it therefrom.

Various changes may be made in the specific embodiment of my invention without departing

What I claim is:

1. A lifting fork for attachment to a bull dozer blade comprising a fork member, an upwardly extending bracket on the rear end of said fork member for attachment to a bull dozer blade, and an upwardly extending arm pivotally connected to said fork member adapted for pivotal connection to said bull dozer blade.

2. An attachable lifting fork for attachment to a bull dozer blade having a female hook portion comprising a fork member, brackets extending upwardly from the rear upper surface thereof for pivotal connection to the bottom of said bull dozer blade, and an upwardly extending arm connected to said fork member having a hook portion for engaging the female hook portion on said bull dozer blade.

3. An attachable lifting fork member for a bull dozer blade comprising a fork member, an upwardly extending arm on said fork member having a hook portion adapted to hook over the top portion of a bull dozer blade, and an attaching member for pivotally connecting the rear end of said fork member to said bull dozer blade.

4. A lifting fork for attachment to a bull dozer blade comprising a fork member, means on the rear end of said fork member for pivotal attachment to a bull dozer blade, an upwardly extending arm connected to said fork member, and means on said arm adapted for connecting said arm to said blade.

5. In combination with a bull dozer blade, a lifting fork member detachably connected thereto, said lifting fork member comprising a tine extending horizontally forwardly from the bottom of said blade, an upwardly extending arm having its lower end secured to said tine intermediate the forward and rear ends thereof, attachment means detachably connecting the upper end of said arm to said blade, and attachment means detachably connecting the rear end of said tine to said blade.

6. The combination as set forth in claim 5 wherein at least one of said attachment means includes a pivotal connection.

LOUIS R. BROCK.

REFERENCES CITED

The following references are of record in the file of this patent:

UNITED STATES PATENTS

| Number | Name | Date |
| --- | --- | --- |
| 2,281,928 | Fletcher | May 5, 1942 |
| 2,300,801 | Parker | Nov. 3, 1942 |
| 2,348,899 | Guignard et al. | May 16, 1944 |
| 2,384,957 | Murphy | Sept. 18, 1945 |